(12) United States Patent
Laval et al.

(10) Patent No.: US 9,085,274 B2
(45) Date of Patent: Jul. 21, 2015

(54) STEERING LOCK FOR A MOTOR VEHICLE

(75) Inventors: Anthony Laval, Erdweg (DE); Lukas Kaliebe, Erdweg (DE)

(73) Assignee: Valeo Sicherheitssysteme GmbH, Erdweg (DE)

(*) Notice: Subject to any disclaimer, the term of this patent is extended or adjusted under 35 U.S.C. 154(b) by 0 days.

(21) Appl. No.: 13/979,228

(22) PCT Filed: Dec. 21, 2011

(86) PCT No.: PCT/EP2011/073549
§ 371 (c)(1),
(2), (4) Date: Nov. 22, 2013

(87) PCT Pub. No.: WO2012/095246
PCT Pub. Date: Jul. 19, 2012

(65) Prior Publication Data
US 2014/0069155 A1    Mar. 13, 2014

(30) Foreign Application Priority Data

Jan. 13, 2011    (EP) ..................................... 11150893

(51) Int. Cl.
*B60R 25/021* (2013.01)
*B60R 25/0215* (2013.01)

(52) U.S. Cl.
CPC ....... *B60R 25/02156* (2013.01); *B60R 25/0215* (2013.01)

(58) Field of Classification Search
CPC ............. B60R 25/02156; B60R 25/0215; B60R 25/02153
USPC ........... 70/182–186, 252, DIG. 6, 187
See application file for complete search history.

(56) References Cited

U.S. PATENT DOCUMENTS

| | | | | |
|---|---|---|---|---|
| 4,413,491 A * | 11/1983 | Thirion | ............................ | 70/252 |
| 5,016,454 A * | 5/1991 | Al-Sheikh | ....................... | 70/185 |
| 5,454,238 A | 10/1995 | Ross et al. | | |
| 5,489,134 A * | 2/1996 | Furuki et al. | ..................... | 296/76 |
| 5,685,180 A * | 11/1997 | Qualters et al. | ................... | 70/188 |
| 5,906,120 A * | 5/1999 | Thacker et al. | ................... | 70/186 |
| 6,034,442 A * | 3/2000 | Mostrom | ....................... | 307/10.2 |
| 6,107,694 A * | 8/2000 | Mostrom | ....................... | 307/10.2 |
| 6,234,039 B1 * | 5/2001 | Garnault et al. | ................. | 74/492 |
| 6,237,378 B1 * | 5/2001 | Canard | ............................ | 70/252 |
| 6,748,774 B2 * | 6/2004 | Dubay et al. | .................... | 70/187 |
| 7,062,944 B2 * | 6/2006 | Gaeth et al. | ..................... | 70/186 |
| 7,127,921 B2 * | 10/2006 | Kinme et al. | .................... | 70/252 |
| 7,509,826 B2 * | 3/2009 | Niedrig | ............................ | 70/186 |

(Continued)

FOREIGN PATENT DOCUMENTS

| | | |
|---|---|---|
| EP | 0846603 A1 | 6/1998 |
| FR | 2799709 A1 | 4/2001 |

OTHER PUBLICATIONS

International Search Report issued in PCT/EP2011/073549 mailed on Apr. 16, 2012 (4 pages).

*Primary Examiner* — Lloyd Gall
(74) *Attorney, Agent, or Firm* — Osha Liang LLP

(57) ABSTRACT

A motorized steering-column lock for a steering column of a motor vehicle, the lock includes a bolt configured to move between a locked position and an unlocked position of a steering column and an electric motor for driving the bolt between the unlocked position and the locked position. The bolt is mounted to be movable in a direction parallel to the steering column.

7 Claims, 5 Drawing Sheets

(56) References Cited

U.S. PATENT DOCUMENTS

| | | | |
|---|---|---|---|
| 7,856,858 B2 * | 12/2010 | Laval et al. | 70/186 |
| 8,272,239 B2 * | 9/2012 | Fong | 70/185 |
| 8,505,346 B2 * | 8/2013 | Sugimoto | 70/252 |
| 8,528,688 B2 * | 9/2013 | Mori et al. | 180/444 |
| 2004/0069025 A1 * | 4/2004 | Dubay et al. | 70/186 |
| 2004/0074266 A1 * | 4/2004 | Zillmann | 70/186 |
| 2005/0120761 A1 * | 6/2005 | Rouleau | 70/185 |
| 2006/0070414 A1 * | 4/2006 | Limburg et al. | 70/186 |

* cited by examiner

STEERING LOCK FOR A MOTOR VEHICLE

CROSS-REFERENCE TO RELATED APPLICATIONS

This application is a National Stage application of International Patent Application No. PCT/EP2011/073549, filed on Dec. 21, 2011, which claims priority pursuant to 35 U.S.C. §119(a) to European Patent Application No. EP11150893.3, filed on Jan. 13, 2011. Both applications are hereby incorporated by reference in their entirety.

BACKGROUND OF INVENTION

1. Field of the Invention

One or more embodiments of the present invention relate to steering-column locks of the electrically motorized type.

2. Background Art

Many constructions of steering-column locks are known. First, steering-column locks have been proposed comprising a motor and a gearwheel which drives a locking bolt via a cam or a gradient associated with the gearwheel, in which the gearwheel rotates about a shaft which is parallel to the output shaft of the electric motor, or else in which the gearwheel rotates about a shaft which is perpendicular to the output shaft of the electric motor.

The bolt then travels in a sliding manner closer to the steering column under the action of a cam or of a gradient formed by the gearwheel until it engages a peripheral ring gear of the steering column.

The known electrically motorized steering-column locks also have too great a space requirement for a certain arrangements with considerable space constraints, such as arrangements in a bottom portion of the steering column, for example close to or incorporated into a motorized assistance module for assisting the rotation of the steering column.

SUMMARY OF INVENTION

One or more embodiments of the present invention may alleviate the drawbacks of the known electrically motorized steering locks by a steering-column lock configuration that may be housed in a restricted space in the bottom portion of the steering column.

Accordingly, one or more embodiments of the present invention provides a motorized steering-column lock for a motor vehicle comprising a bolt movable between a locked position and an unlocked position of the column and an electric motor for driving the bolt between the unlocked position and the locked position, in which the bolt is mounted so as to approach the steering column in a direction parallel to the steering column.

Other features, objects and advantages of one or more embodiments of the present invention will become apparent on reading the following detailed description made with reference to the appended figures.

DETAILED DESCRIPTION

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

Figure 1:
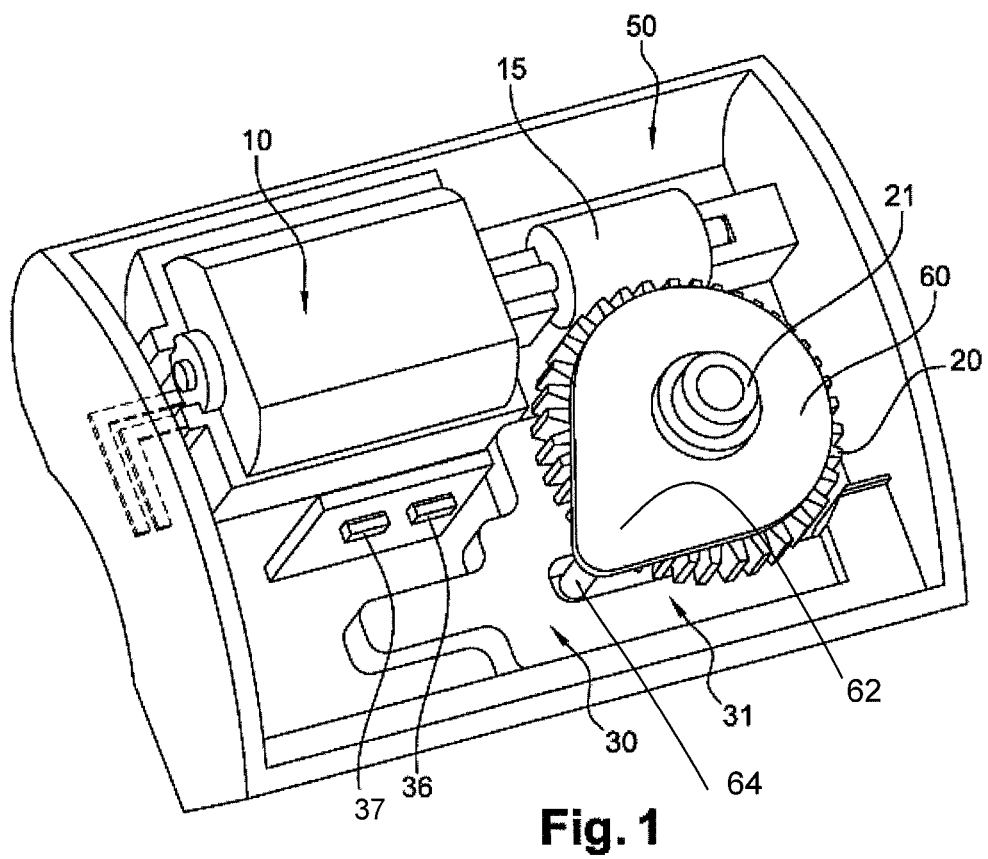
FIG. 1 is an overview of a steering lock according to one or more embodiments of the present invention.
Figure 2:
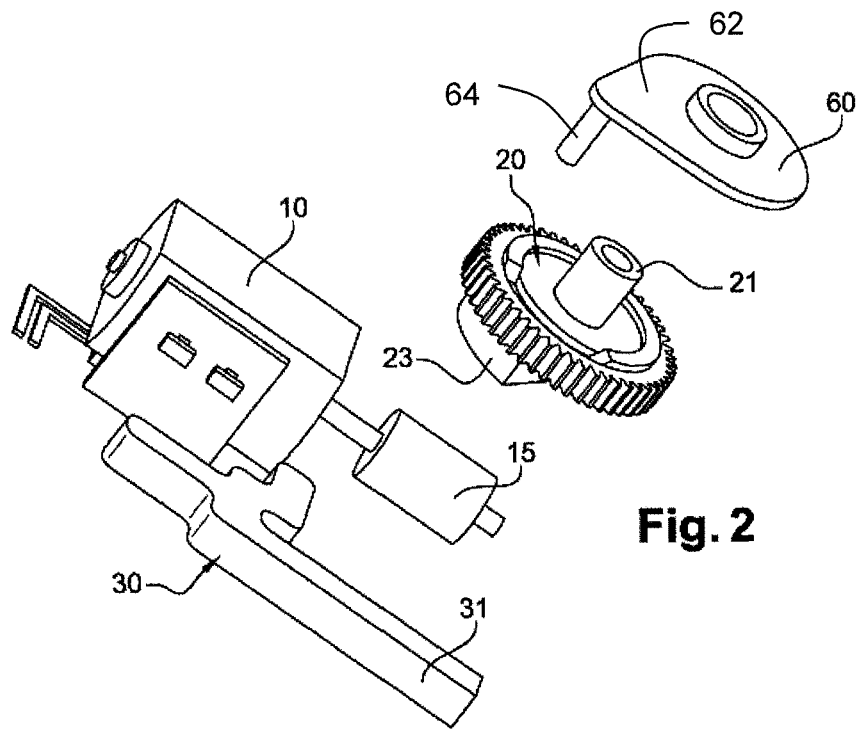
FIG. 2 is an exploded view in perspective from above of a steering lock according to one or more embodiments of the present invention.
Figure 3:
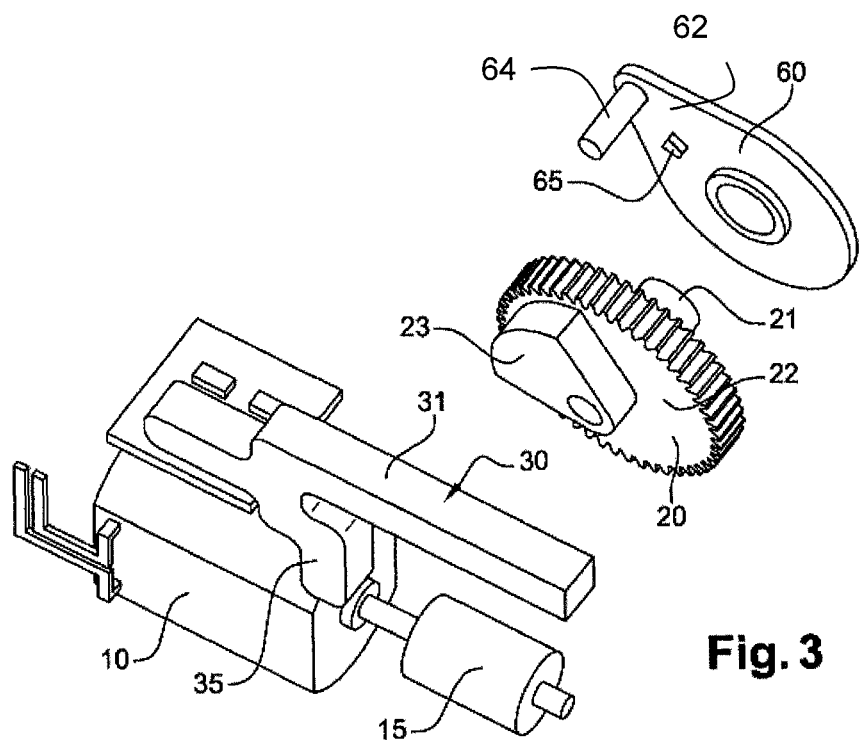
FIG. 3 is an exploded view in perspective from below of a steering lock according to one or more embodiments of the present invention.
Figure 4:
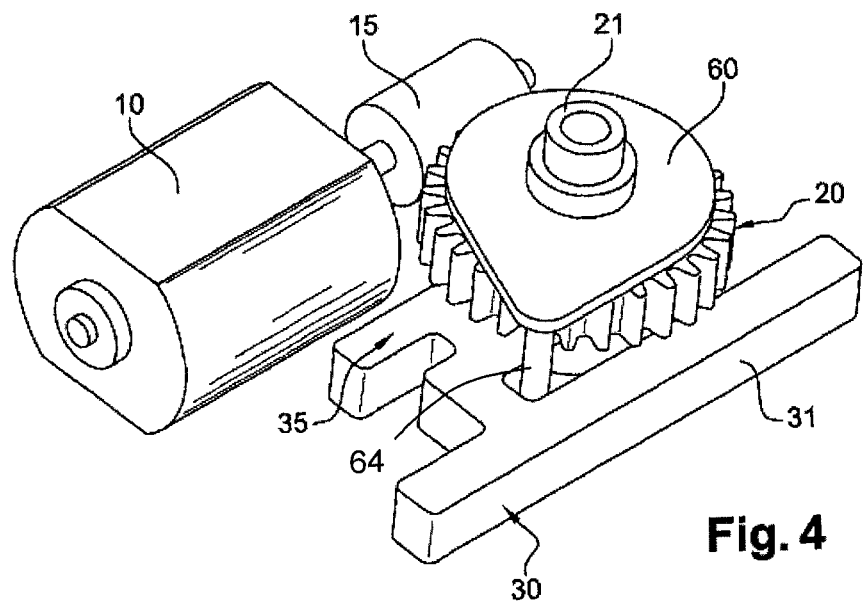
FIG. 4 is a partial view of a steering lock in the unlocked and immobilized position according to one or more embodiments of the present invention.
Figure 5:
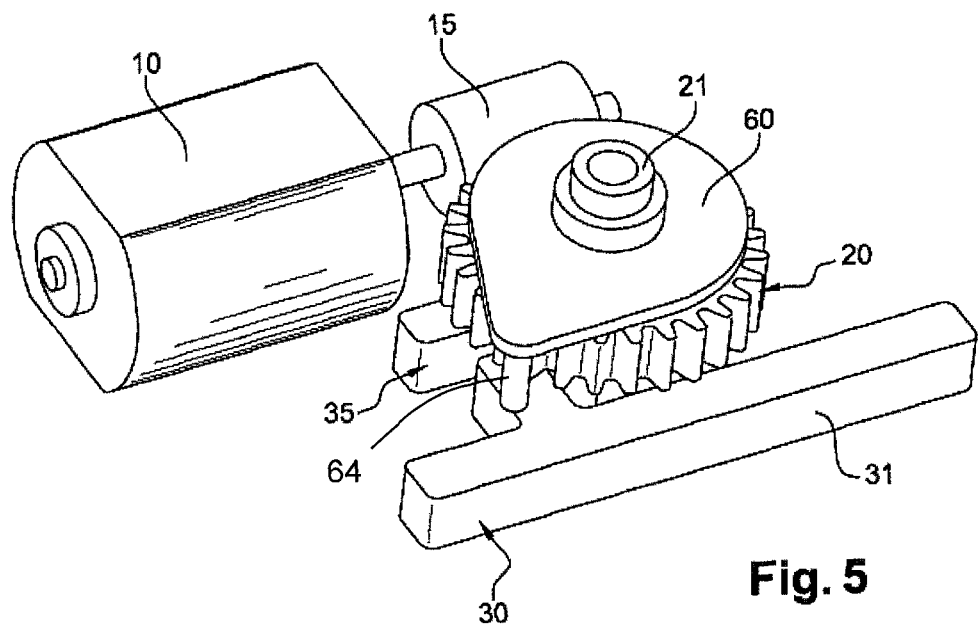
FIG. 5 the position is a partial view of a steering lock in the locked and released position according to one or more embodiments of the present invention.
Figure 6:
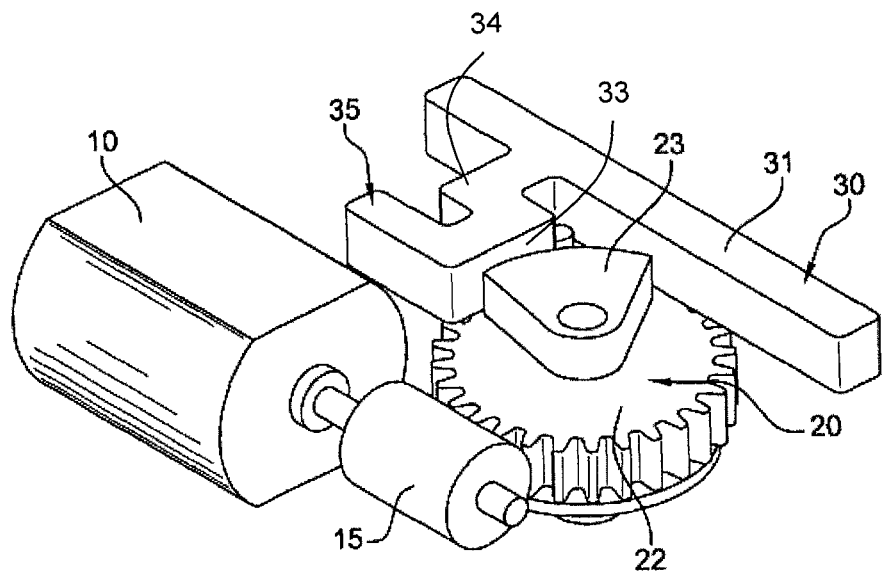
FIG. 6 is a partial view with no shuttle and from below of a steering lock in the unlocked and immobilized position according to one or more embodiments of the present invention.
Figure 7:
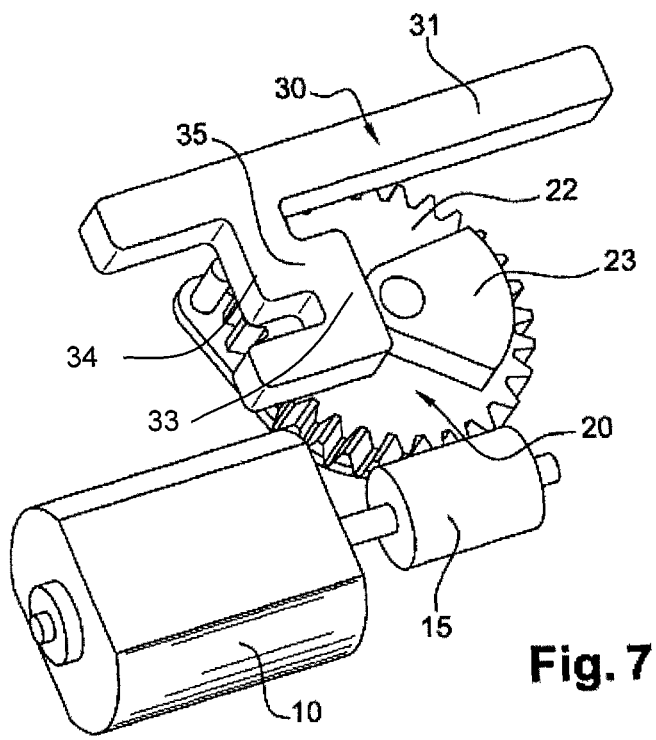
FIG. 7 is a partial view with no shuttle and from below of a steering lock in the locked and released position according to one or more embodiments of the present invention.

The steering lock shown in FIG. 1 comprises an electric motor 10 furnished with an output shaft forming a worm 15, a gearwheel 20 engaged in the worm 15, a bolt 30 mounted so as to slide, these various elements being placed in a housing 50.

The gearwheel 20 is mounted so as to rotate about a rotation shaft 21 which extends perpendicularly to the output shaft of the motor 10 so that the output shaft of the motor is indistinguishable in the geometric plane of the gearwheel 20.

The gearwheel 20 has a first face 22, turned toward a steering column not shown, which is furnished with a cam 23 having a disk portion shape which interacts in thrust with the bolt 30. For this purpose, the bolt 30 has, in addition to a main bar 31, a lateral appendage 35 capable of being interposed on the path of the cam 23 when the cam 23 pivots with the gearwheel 20 in order to come closer to an outer ring gear of the steering column. The bolt 30 is advantageously returned to the locked position by a spring.

This lateral appendage 35 has a curved shape, the top curve 33 forms a bearing wall for the cam 23 of the gearwheel 20 and of which the bottom curve 34 receives within it an element for retention in the unlocked position as will be described below.

Therefore, when the gearwheel 20 is rotated, the bolt 30 travels slidingly in a plane parallel to the main plane of the gearwheel 20. Since the gearwheel 20 is in this instance oriented such that it is in a plane parallel to the steering column, the bolt 30 therefore itself travels parallel to the main direction of the steering column.

In order to be locked when the bolt 30 is in the final position, the steering column has a lateral appendage interacting with the bolt 30, in this instance a ring gear 80 of which the teeth have between them interstices accommodating the bolt 30 in its extended locked position.

In another embodiment, the lateral appendage may be a simple finger of radial orientation relative to the main direction of the steering column, or else a transverse plate furnished with a series of through-holes and capable of accommodating the bolt 30 in multiple angular positions of the steering column.

The gearwheel 20 has, on its face oriented away from the column, a track 24 in an arc of a circle 24 formed here in the form of a built-up element out of the face 22 of the gearwheel 20.

The track 24 extends over three-quarters of the angular extent about the rotation shaft 21 of the gearwheel 20 and has, at each of its ends, sliding bevels which adjoins the main plane of the face 22.

The track 24 interacts with a shuttle 60 mounted so as to move slidingly sideways to the main plane of the gearwheel 20 and more specifically in this instance mounted so as to slide on the rotation shaft 21 of the gearwheel 20.

This shuttle 60 has a radial extension 62 in the direction of the bolt 30 and, via a finger 64 oriented sideways to the main plane of the gearwheel 20, extends inside the bolt 30 in a selective manner as will be explained below.

Specifically, the shuttle 60 rests against the track 24 via a slide 65 formed in relief on the shuttle face turned toward the gearwheel 20 and the shuttle 60 is thus kept resting against the track 24 sideways to the gearwheel 20 by a spring, not shown. Due to this, the shuttle 60 sustains a movement sideways to the gearwheel 20 while the latter pivots on itself when the slide 65 rises or falls from the built-up track 24. During this movement, the shuttle 60 is held against a pivoting about the rotation shaft 21 of the gearwheel 20 by interaction of a finger 64 made of the same material as the steering-lock housing and engaged in an orifice passing through the shuttle 60.

Figure 8:
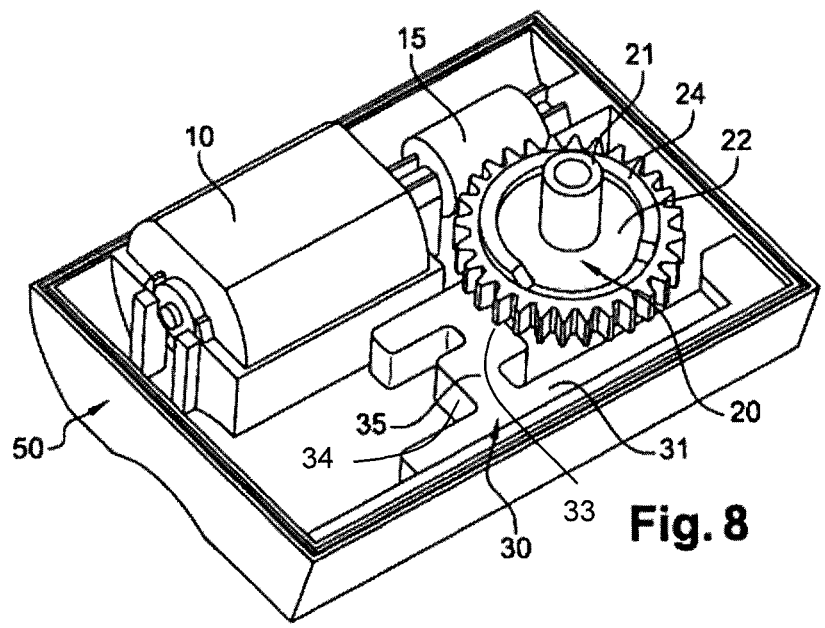
FIG. 8 is a partial view with no shuttle and from above of a steering lock in the unlocked position according to one or more embodiments of the present invention.

As shown in FIG. 8, the built-up track 24 is placed such that, when the bolt 30 is in the locked position of the steering column, the shuttle 60 is separated from the gearwheel 20, that is to say that the slide 65 is resting on the track 24 and the overlocking finger 64 of the shuttle does not then engage the bolt 30. Conversely, the built-up track 24 is placed such that the shuttle 60 is brought closer to the gearwheel 20, that is to say that the slide 65 is out of the track 24 when the bolt 30 is in the unlocked position and that the shuttle 60 then secures, by the overlocking finger 64, the bolt 30 in the unlocked position. Accordingly, the shape formed by the bolt 30 has curve 34 proximate to the main body of the bolt 30 facing the overlocking finger 64 when the bolt 30 is in the unlocked position, thus allowing the overlocking finger 64 to penetrate the proximal curve of the S. The finger 64 is then positioned as an obstacle on the return path of the bolt 30 and more specifically of the proximal curve of the S, thus preventing an inadvertent return of the bolt 30 to its locked position.

As an alternative, the built-up element presented by the track 24 increases during the travel of the track 24 such that a first end of the arc of a circle described by the track 24 is close to a main plane of the gearwheel 20 and another end of the arc of a circle described by the track 24 is further away sideways from the main plane of the gearwheel 20.

By virtue of the present orientation of the bolt 30 moving parallel to the steering column, whether it be driven by a gearwheel 20 thus positioned or positioned differently for example perpendicularly to the steering column, it gives an overall space requirement of the steering-column lock that is particularly low and notably in the direction radial to the steering column.

This low space requirement is particularly notable in the case in which the main plane of the gearwheel 20 is oriented parallel to the steering column, but a gain in space requirement is already easily obtained by such an orientation of the movement of the bolt 30 even when the gearwheel 20 is perpendicular to the steering column.

Moreover, although a bolt 30 sliding parallel to the steering column is preferred in terms of space requirement, a gain in space requirement is already obtained when the portion of the bolt 30 that engages the steering column approaches the steering column in a direction substantially parallel to the column, whether the bolt 30 slides or rotates, in which case a movement of an end of the bolt that is substantially tangential to and therefore parallel with the column or a lateral appendage of the latter provides a considerable advantage in terms of space requirement of the steering lock.

In the present example, the housing 50 of the steering lock is advantageously arranged in the form of a liquor bowl, that is to say as an extension in the main direction of the steering column and in a cross section in the shape of a bean, that is to say included between two transversal boundaries of an arc of a circle. The first boundary has a lesser radius and the second boundary has a greater radius.

The steering-column lock then closely follows a cylinder contour of the steering column so as to occupy only a small space radial to the column. Such a space requirement is particularly advantageous in the present case in which the steering-column lock is an element constituting a module of motorized assistance to the rotation of the steering column. Incorporating the steering lock in a module of motorized assistance to the pivoting of the steering column provides an advantage in terms of safety since the steering lock is then in a particularly low portion of the column, at a particularly great distance from the instrument panel where it is the predilection of a thief to operate and in a particularly inaccessible portion of the vehicle.

Figure 9:
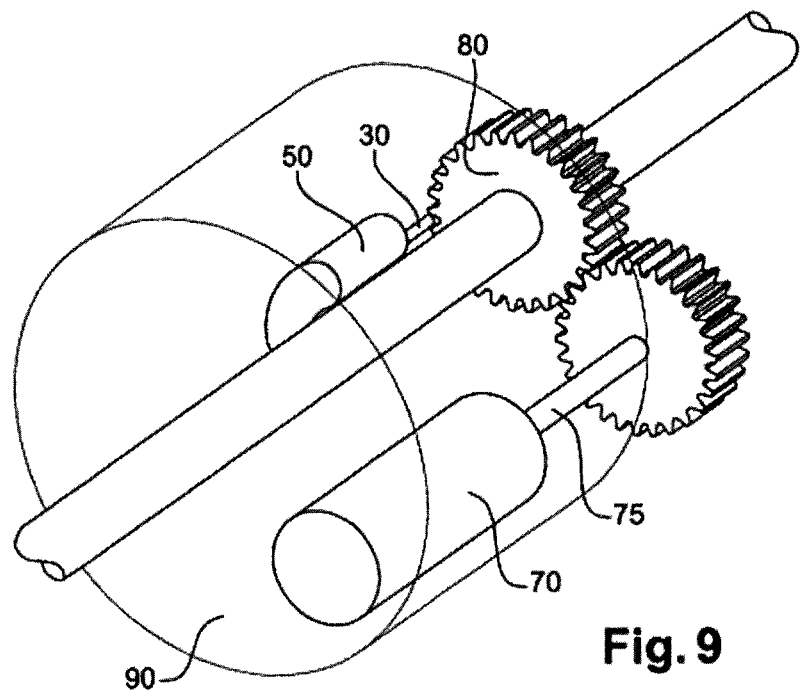
FIG. 9 represents an assembly including a steering column and a module for assisting the pivoting of a steering column, the module includes a steering lock according to one or more embodiments of the present invention.

In the present case and as shown in FIG. 9, the motorized assistance module comprises an assisting motor 70 which is oriented such that its output shaft 75 extends parallel to the steering column. The output shaft 75 of the motor 70 has peripheral gear teeth in which a ring gear 80 surrounding the steering column meshes in order to rotate the latter. The ring gear 80 is advantageously the ring gear in which the bolt 30 engages such that only one ring gear is used for the two functions of driving and immobilization, further reducing the space requirement for the implementation of the described assisting module.

Advantageously, the steering lock and the assisting motor 70 are placed radially opposite to the steering column such that the bolt 30 and the output shaft 75 of the assisting motor do not interfere. The motorized assistance module advantageously comprises one and the same electronic unit for controlling the pivoting assistance and controlling the immobilization of the column, which ensures that no assistance control is applied to the assisting motor when the steering lock is in the locked position.

Because the steering-column lock is a portion of the module for motorized assistance of the rotation of the steering column, the control unit that is common to the motorized assistance and to the locking of the column is advantageously fitted with a control logic using a slight rotational movement of the steering column when it simultaneously commands a force to operate the unlocking of the bolt 30. Thus, by this slight movement, any frictional retention is removed between the bolt 30 and the steering column, for example between the bolt 30 and a lateral edge of a tooth of the ring gear 80 and the bolt 30 travels slidingly in a reliable manner with each switching on of the vehicle.

The control unit is advantageously implemented in the form of an electronic circuit placed in a common housing 90 of the assisting motor 70 and of the steering lock. The electronic circuit is advantageously positioned outside the housing 50 of the steering lock. In addition to the implementation of controlling the steering lock via this control unit, in this instance notably takes account of the positioning of the bolt 30 that is indicated to it by the receipt of output signals from sensors 36, 37 of positioning of the bolt 30 that are placed in the steering lock. These two sensors, referenced 36 and 37, are in this instance magnetic sensors activated by a magnet placed on the bolt 30 but which, as a variant, can be mechanical sensors activated by a boss of the bolt 30. As an alternative, they may be sensors associated with the gearwheel 20, the immobilizing shuttle or any other member of the steering lock. The signals delivered by these sensors 36, 37 are advantageously directly read by the control unit.

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

The invention claimed is:

1. A motorized steering-column lock for a motor vehicle, the motor vehicle comprising a steering column, the lock comprising:
   a bolt configured to move between the locked position and the unlocked position of the steering column;
   an electric motor for driving the bolt between the unlocked position and the locked position, wherein the bolt is mounted to be movable in a direction parallel to the steering column,
   wherein the electric motor comprises an output shaft having a worm disposed thereon and a gearwheel oriented in a plane parallel to the steering column with which the worm is engaged; and
   an element movable between a position of immobilizing the bolt in the unlocked position and a position of releasing the bolt,
   wherein the element for immobilizing the bolt is disposed on a portion of the gearwheel, such that when the gearwheel is rotated, the element is pushed away from the bolt.

2. The steering-column lock as claimed in claim 1, wherein the motor is oriented such that the output shaft is in a plane parallel to the steering column.

3. The steering-column lock as claimed in claim 1, wherein the bolt is mounted so as to slide in the steering-column lock in a direction parallel to the steering column.

4. The steering-column lock as claimed in claim 1, wherein the gearwheel comprises an arc-shaped track on which the element is disposed such that when the gearwheel is rotated, the element progressively moves toward or away from the gearwheel.

5. A module for assisting with rotation of a steering column comprising:
   an assisting motor configured to apply a pivot force to the steering column;
   a steering-column lock comprising:
      a bolt configured to move between a locked position and an unlocked position of the steering column; and
      an electric motor for driving the bolt between the unlocked position and the locked position, wherein the bolt is mounted to be movable in a direction parallel to the steering column,
      wherein the electric motor comprises an output shaft having a worm disposed thereon and a gearwheel oriented in a plane parallel to the steering column with which the worm is engaged.

6. An assembly comprising:
   a steering column of a motor vehicle; and
   a steering-column lock comprising:
      a bolt configured to move between a locked position and an unlocked position of the steering column;
      an electric motor for driving the bolt between the unlocked position and the locked position, wherein the bolt is mounted to be movable in a direction parallel to the steering column,
      wherein the electric motor comprises an output shaft having a worm disposed thereon and a gearwheel oriented in a plane parallel to the steering column with which the worm is engaged; and
      an element movable between a position of immobilizing the bolt in the unlocked position and a position of releasing the bolt,
      wherein the element for immobilizing the bolt is disposed on a portion of the gearwheel, such that when the gearwheel is rotated, the element is pushed away from the bolt.

7. An assembly comprising:
   a steering column of a motor vehicle; and
   a module for assisting a rotation of the steering column comprising:
      an assisting motor configured to apply a pivot force to the steering column;
      a steering-column lock comprising:
         a bolt configured to move between a locked position and an unlocked position of the steering column; and
         an electric motor for driving the bolt between the unlocked and the locked position, wherein the bolt is mounted so as to approach the steering column in a direction parallel to the steering column,
         wherein the electric motor comprises an output shaft having a worm disposed thereon and a gearwheel oriented in a plane parallel to the steering column with which the worm is engaged, and
   wherein the steering column comprises a peripheral ring gear with which the bolt is engaged when in the locked position and the peripheral ring gear receives the pivot force delivered by the assisting motor.

* * * * *